US008623250B2

(12) United States Patent  
Thomasset

(10) Patent No.: US 8,623,250 B2  
(45) Date of Patent: Jan. 7, 2014

(54) METHOD FOR PRODUCING A MULTI-LAYERED OBJECT

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 711 days.

(21) Appl. No.: 12/525,412

(22) PCT Filed: Jan. 29, 2008

(86) PCT No.: PCT/IB2008/050313
§ 371 (c)(1), (2), (4) Date: Oct. 15, 2009

(87) PCT Pub. No.: WO2008/096290
PCT Pub. Date: Aug. 14, 2008

(65) Prior Publication Data
US 2010/0047542 A1    Feb. 25, 2010

(30) Foreign Application Priority Data

Feb. 7, 2007   (EP) .................................... 07101888

(51) Int. Cl.
B29C 47/00      (2006.01)
B29C 47/06      (2006.01)
B29C 70/80      (2006.01)
B28B 3/02       (2006.01)

(52) U.S. Cl.
USPC . 264/148; 264/167; 264/173.12; 264/173.15; 264/173.16; 264/177.17; 264/210.2; 264/268; 264/319

(58) Field of Classification Search
USPC ........................................................ 264/148
See application file for complete search history.

(56) References Cited

U.S. PATENT DOCUMENTS

| 3,822,161 | A | * | 7/1974 | Haase ............................ 156/245 |
| 4,649,013 | A |   | 3/1987 | Yamamoto et al. |
| 5,114,650 | A | * | 5/1992 | Franck et al. ................. 264/151 |
| 5,628,950 | A | * | 5/1997 | Schrenk et al. ............... 264/241 |
| 7,125,508 | B2 | * | 10/2006 | Ide et al. ....................... 264/148 |
| 7,691,305 | B2 | * | 4/2010 | Sutton et al. ................. 264/211 |
| 7,785,510 | B2 | * | 8/2010 | MacKinnon et al. ......... 264/148 |
| 2002/0104818 | A1 | * | 8/2002 | Riffer ............................ 215/347 |

(Continued)

FOREIGN PATENT DOCUMENTS

| EP | 0 926 078 | 6/1999 |
| WO | WO 2005/084902 | 9/2005 |
| WO | WO 2005/084904 | * 9/2005 ............... B32B 1/00 |

OTHER PUBLICATIONS

English Translation of International Preliminary Report on Patentability (IPRP)—Chapter II for PCT/IB2008/050313 mailed Aug. 12, 2008.

(Continued)

Primary Examiner — Jeffrey Wollschlager
(74) Attorney, Agent, or Firm — Nixon & Vanderhye P.C.

(57) ABSTRACT

The invention relates to a method of manufacturing a multilayer object in synthetic resin (9) by compression molding a dose of molten multilayer resin (1) comprising at least one functional layer (2,20), each layer of the dose being in the molten state at the time of compression; the method consisting at least in co-extruding the resins through a die, in cutting the extrudate periodically in order to obtain a dose (1), then in depositing the dose (1) in the molten state in the cavity of a mold; the method thereby defining, within the dose, an extrusion direction and an arrangement of the functional layer (2,20) parallel to the extrusion direction; the method being characterized in that the dose is compressed along a compression axis (16) which intersects the extrusion direction, so as to introduce, into the flow of the layers, asymmetry with respect to the compression axis (16).

The invention also relates to an object obtained with the aforementioned method, to a dose used in the context of this method and to a device for implementing the said method.

8 Claims, 10 Drawing Sheets

(56) References Cited

U.S. PATENT DOCUMENTS

2006/0029775 A1* 2/2006 MacKinnon et al. ......... 428/141
2007/0190286 A1* 8/2007 Thomasset ..................... 428/76

OTHER PUBLICATIONS

International Search Report for PCT/IB2008/050313 mailed Aug. 12, 2008.
Foreign-language Written Opinion of the International Searching Authority for PCT/IB2008/050313 mailed Aug. 12, 2008.
Database WPI Week 199231; Accession No. 1992-253408, & JP 04-169207 (Jun. 17, 1992).
Database WPI Week 199148; Accession No. 1991-349948, & JP 03-234604 (Oct. 18, 1991).
Database WPI Week 200575; Accession No. 2005-734002, & WO 2005/092603 (Oct. 6, 2005).

* cited by examiner

FIG. 1 (Prior Art: JP 4-169207)
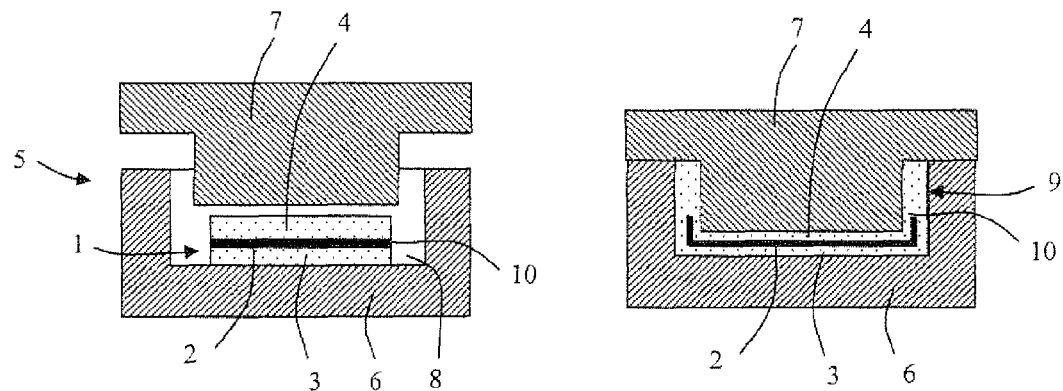
FIG. 2 (Prior Art: US 4904512)
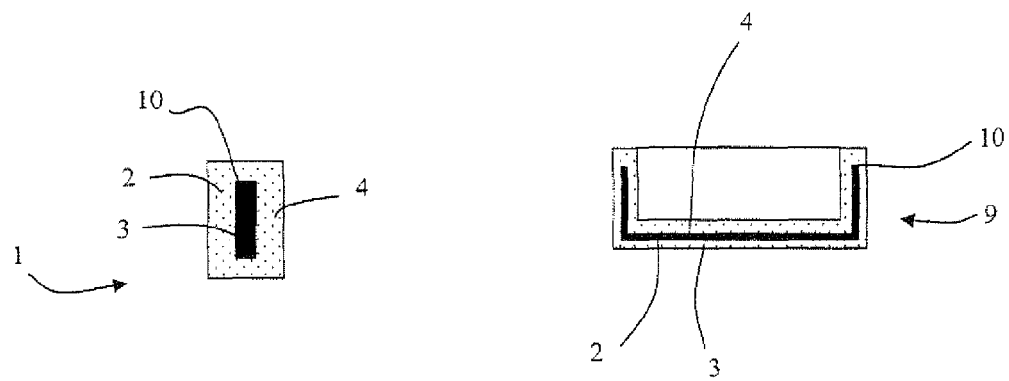

FIG. 8
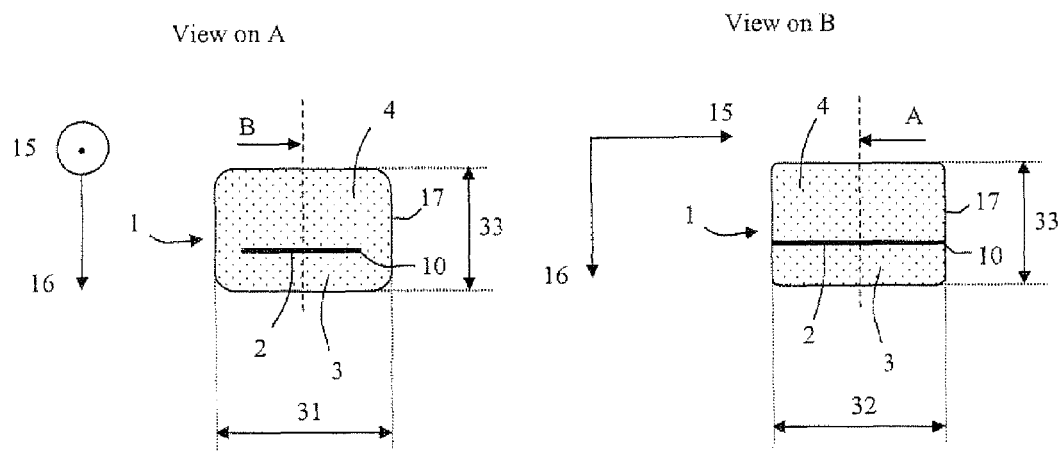
FIG. 9
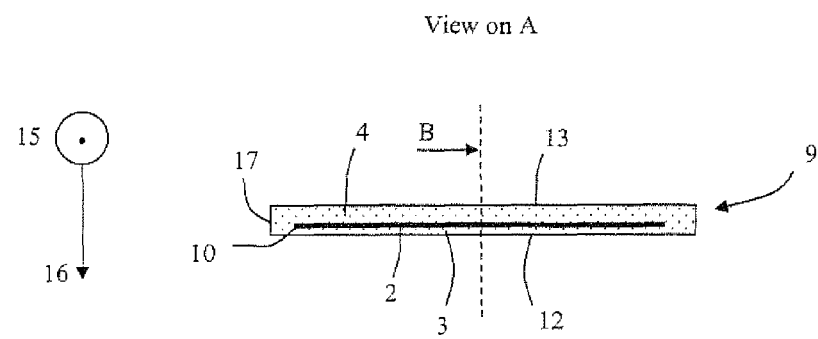
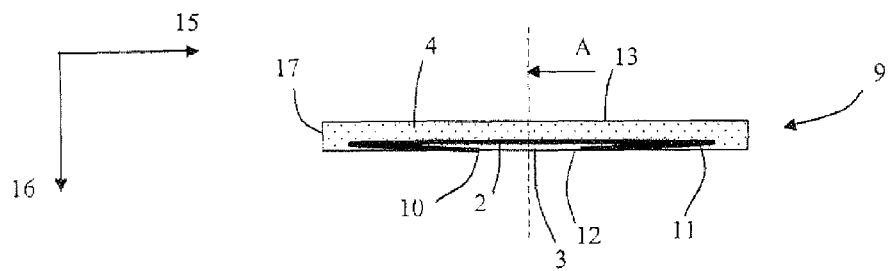

FIG. 16
FIG. 17
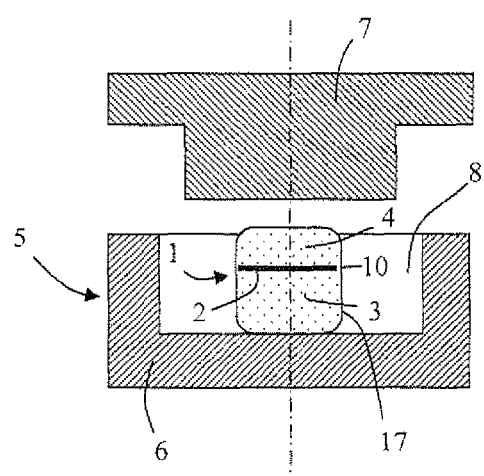
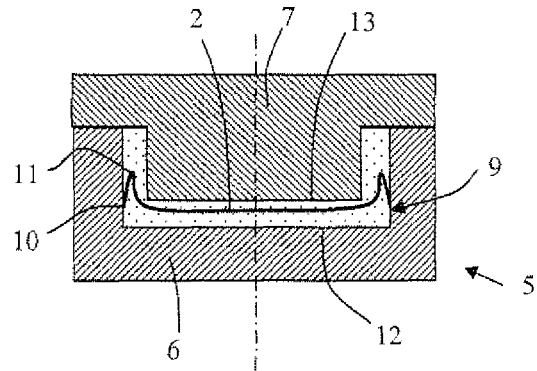

METHOD FOR PRODUCING A MULTI-LAYERED OBJECT

This application is the U.S. national phase of International Application No. PCT/IB2008/050313, filed 29 Jan. 2008, which designated the U.S. and claims priority to Europe Application No. 07101888.1 filed 7 Feb. 2007, the entire contents of each of which are hereby incorporated by reference.

FIELD OF THE INVENTION

The present invention relates to a method for producing multilayer objects by compression moulding a multilayer dose consisting of a molten resin.

PRIOR ART

Patent document JP4169207 describes a method for producing a multilayer object by compressing, in a mould, a dose the layers of which are positioned at right angles to the compression axis. FIG. 1 illustrates the method described in that Japanese patent. According to that method, a dose 1 in the shape of a coin and formed of a stack of several films is placed in a mould 5. A film 2 positioned at the centre of the multilayer structure has reduced permeability. The invention described in patent document JP4169207 consists in forming a multilayer object by compressing the dose 1 in the mould 5 and trapping the ends 10 of the layer 2 inside the object. In order to trap the ends of the film 2, patent document JP4169207 proposes compressing the dose at a temperature above the melting point of the films 3 and 4 and below the melting point of the film 2. Patent document JP4169207 described, by way of example, a dose formed of films 3 and 4 made of polyethylene and the film 2 made of polyamide. The method described in patent document JP4169207 has a number of disadvantages. According to patent document JP4169207 the intermediate layer 2 is in the solid state at the time of moulding because the moulding temperature is below the melting point of the said film. As a result, the film 2 undergoes little or no deformation at the time of moulding. The method described in patent document JP4169207 makes it difficult for the functional layer 2 to travel as far as the end of the object. This method also entails producing, heating and transferring into the cavity 8 of the mould 5, a flat dose of slender thickness. The operations involved in producing and handling the dose are insufficiently disclosed in the Japanese patent and it would appear difficult for this method to be used to manufacture objects at high production rates. Patent U.S. Pat. No. 4,904,512 illustrated in FIG. 2, describes a multilayer object produced by compression moulding a multilayer dose. That patent proposes the use of a cylindrical dose 1 comprising a functional layer 2 fully imprisoned between the layers of resin 3 and 4. The ends 10 of the layer 2 are trapped within the dose by virtue of an extrusion method and allow discontinuous supply of the functional layer. However, the compressing of the dose 1 in the mould 8 is not described in patent U.S. Pat. No. 4,904,512. For example, the dimensions of the dose and how it is positioned in the cavity 8 of the mould 5 are not mentioned. The description of the invention keeps quiet as to how the dose is compressed. However, given the objects described in that patent and given that it seeks to obtain a symmetric flow of the compressed material, the result of this is that compression must necessarily be performed in the direction parallel to the extrusion axis.

The solution described in patent U.S. Pat. No. 4,904,512 nonetheless runs into a number of difficulties. As described in patent U.S. Pat. No. 4,904,512, a co-extrusion device with a shut-off valve mechanism for the functional resin controls the intermittent flow of the said functional resin. However, the shut-off valve mechanisms are complicated and expensive and do not provide sufficiently precise control over the intermittent flow at high production rate. A second disadvantage lies in the difficulty of producing doses containing more than two resins. In general, the functional layer does not naturally adhere to the resin that forms the object. This disadvantage may lead to poor adhesion between the layers and to defective objects.

Finally, a third disadvantage lies in the difficulty therein in optimizing automation of the successive manufacture of a large number of objects.

This is because once the dose has been produced, it cannot be compressed immediately as soon as it leaves the extruder. At minimum, the dose needs to be shifted a considerable distance or rotated through 90°, thus entailing more complicated apparatus and slowing the object production rate.

Compression moulding of multilayer thermoplastic resin objects at high production rates is advantageously performed by extruding a multilayer dose which is transferred to the cavity of a mould and then compressed in the molten state in order to form the object. This process, which is described in the prior art, consists of manufacturing objects such as stoppers or cups by compressing the dose positioned at the centre of the tooling and along its axis of symmetry. This configuration makes it possible to obtain axisymmetric flow at the time of compression and, ultimately, axisymmetric distribution of the functional layer within the object.

However, when the dose is compressed along the extrusion axis, at least two major difficulties are encountered: the discontinuity of the functional layer in the centre of the object, and an excessive amount of functional material in the object.

The first difficulty is encountered when the dose contains a small amount of functional material so as to allow an economical production of multilayer objects. The functional material then forms, within the dose, a thin layer parallel to the extrusion axis. The functional resin is absent from the central part of the dose and therefore from the central part of the object.

The second difficulty is encountered in positioning the functional material at the centre of the dose as proposed in patent U.S. Pat. No. 4,904,512. However, in order to distribute the functional layer as far as the periphery of the object, it is necessary to increase considerably the amount of functional resin in the dose so that the functional resin forms a cylinder of sufficiently large radius.

While compressing in a direction that coincides with the axis of symmetry of the dose proves satisfactory as far as the object formed is concerned when the layers are positioned at right angles to the compression direction, it is not, however, possible to obtain high production rates, especially since this dose cannot be extruded.

There is therefore a need to overcome the aforementioned problems. This need is felt particularly keenly in respect of doses which have an axis of symmetry that coincides with the extrusion direction.

OBJECT OF THE INVENTION

The present invention makes it possible to produce multilayer objects by compression moulding without running into the aforementioned problems. The invention consists in compressing a dose in a direction that intersects the extrusion direction in order to produce multilayer objects at high production rates.

SUMMARY OF THE INVENTION

The invention consists in a method of manufacturing a multilayer object in synthetic resin by compression moulding a dose of molten multilayer resin comprising at least one functional layer, each layer of the dose being in the molten state at the time of compression; the method consisting at least in co-extruding the resins through a die, in cutting the extrudate periodically in order to obtain a dose, then in depositing the dose in the molten state in the cavity of a mould; the method thereby defining, within the dose, an extrusion direction and an arrangement of the functional layer parallel to the extrusion direction; the method being characterized in that the dose is compressed along a compression axis which intersects the extrusion direction, so as to introduce, into the flow of the layers, asymmetry with respect to the compression axis.

The invention also consists in a multilayer object produced by compression moulding in which the distribution of the layers is asymmetric.

The invention also relates to a dose of molten resin that is defined hereinabove.

The invention finally relates to a device to implement the aforementioned method, which device comprises means for extruding a multilayer dose in an extrusion direction and means for compressing the said dose in a direction which intersects the extrusion direction.

The invention makes it possible to produce an object of asymmetric geometry with an asymmetric distribution of the layers. A multilayer object, such as a stopper or a cap, that has a functional layer covering the entire surface of the object can be obtained.

The invention also makes it possible to produce an object of asymmetric geometry, such as a stopper of oval geometry.

It will finally be noted that, in the case of most of the objects according to the invention, some portions thereof have a number of layers that exceeds the number of layers initially present in the dose.

By comparison with the teachings of the prior art, the novelty of the method according to the invention lies in the production, from extrusion, of a multilayer dose together with its compression in a direction that crosses the layers. As previously explained, performing these two operations jointly leads to a dose being compressed along an axis which is not an axis of symmetry of the said dose. The resulting multilayer flows are not described in the prior art, and neither are the multilayer objects. Patent documents JP4169207 and U.S. Pat. No. 4,904,512 do not describe doses that are asymmetric with respect to the compression axis nor do they describe flows with no axis of symmetry nor do they describe axisymmetric objects in which the multilayer structure has no axis of symmetry.

The proposed method according to the invention runs counter to the common sense of one skilled in the art which would be to compress a dose which was symmetric with respect to the compression axis in order to obtain uniform flow in all directions and ultimately obtain an object the axis of symmetry of which was also the axis of symmetry of its multilayer structure.

DETAILED DESCRIPTION OF THE INVENTION

The following terms are used in the description of the invention:

Length, width and height of the dose the dose is defined by its height in the compression direction, its length in the extrusion direction, and its width. The height and the width of the dose depend on the extrusion tooling; the length of the dose depends on how the extruded rod is cut. When the dose is cylindrical, the height and the width are identical.

Vertical axis: compression axis 16.

Functional layer: the functional layer is of small thickness and gives the object specific properties. The functional layer may, for example, be a barrier layer.

The invention will be better understood hereinafter through a detailed description of some examples illustrated by the following figures.

BRIEF DESCRIPTION OF THE FIGURES

FIGS. 1 and 2 describe solutions proposed in the prior art for producing an object by compressing a dose in a mould.

FIG. 8 is an example of a dose excluded along the axis 15 and which has no symmetry with respect to the compression axis 16.

FIG. 9 illustrates the multilayer object obtained after compressing the dose 1 illustrated in FIG. 8 along the axis 16. This object 9 has an asymmetric multilayer structure although it does have the functional layer 2 distributed throughout the object.

FIG. 12 schematically depicts the extruding of a multilayer rod 21.

FIG. 13 shows the cutting of the rod to form a multilayer dose 1.

FIG. 14 illustrates the positioning of the dose 1 in the cavity 8 of the mould 5.

FIG. 15 shows the manufacture of the object 9 and the distribution of the layers within the object.

FIGS. 16 and 17 show the influence that the geometry of the object has on the position of the ends 10 of the function layer 2 within the object 9.

FIG. 26 shows the positioning of the dose in the mould.

FIG. 27 shows the object obtained after compression.

FIG. 28 the dose extruded along the axis 15.

FIG. 29 shows the deformation of the dose along the compression axis 16.

FIG. 30 shows the positioning of the pre-deformed dose in the cavity of the mould.

DETAILED DESCRIPTION OF THE FIGURES

Figure 3:
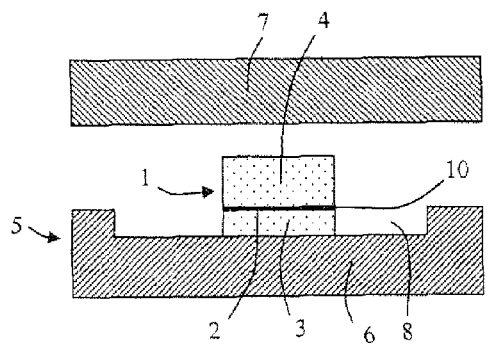
FIGS. 3 to 6 show the compressing, in a mould 5, of a co-extruded dose 1 the functional layers 2 of which are perpendicular to the compression plane and emerge at the surface of the dose. The object 9 obtained is characterized by the folds 11 of the layers 2.

FIG. 3 depicts a sectioned view of a co-extruded dose 1 comprising a functional layer 2 trapped between two layers 3 and 4 of resin. The ends 10 of the layer 2 appear at the surface of the dose or lie near the said surface. The functional layer 2 is not positioned halfway up the height of the dose, the said height of the dose being considered along the compression axis. The extrusion axis lies in a horizontal plane. The dose 1 is compressed in the cavity 8 of a mould 5 comprising at least one shaped cavity 6 and a punch 7 the relative movement of which closes the mould and compresses the dose 1. The direction in which the dose 1 is compressed is at right angles to the layers of which the dose 1 is formed.

Figure 4:
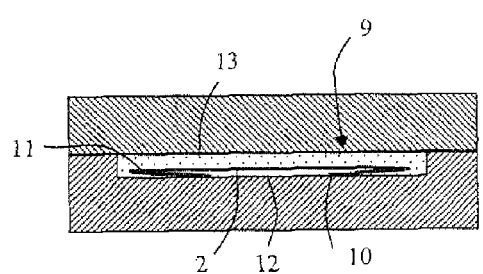

FIG. 4 depicts a sectioned view of the object 9 resulting from the compressing of the dose 1 illustrated in FIG. 3. Contrary to the teachings of the prior art, it is found that the stacking of the layers in the object 9 differs from that in the dose 1. Contrary to all expectations, it is found that the functional layer 2 forms a fold 11 and that the ends 10 of the layer 2 appear at the surface 12 of the object or near to the said surface. The object 9 thus formed at least locally has a number of layers that exceeds the initial number of layers in the dose. It is also found that the position of the layer in the dose predetermines the surface of the object at which the ends 10 of the said layer 2 will appear. If the layer 2 lies in the lower part of the dose 1 then the ends 10 of the layer 2 will appear in the bottom surface 12 of the object. FIG. 4 also shows that the layer 2 has spread as far as the end of the object 9, the fold 11 of the layer 2 lying at the radially most distant point. It was found that the distance over which the fold 11 of the layer 2 travelled radially was dependent on the position of the layer 2 in the dose and on the respective dimensions of the dose and of the object. For the same dose and object geometries, the closer the layer 2 is to the bottom surface of the dose, the smaller will be the radial spread of the fold 11.

A theoretical analysis of the flow during the compression method helps with understanding the formation of the fold 11 in the object 9. At the start of the compression method, the end 10 of the layer 2 is located near the propagation front of the flow which is the site of a special kind of flow known as the "fountain effect". Each point on the propagation front travels from the centre of the flow towards the wall. This phenomenon is similar to what is seen with a vertical water jet; at the end of the water jet the water particles travel from the centre of the jet towards the periphery. In this instance, at a precise moment in the compression of the dose, the end 10 flows at the material front and as a result, the end 10 is carried by the fountain effect towards the bottom wall of the mould. From this moment on, dose compression continues and the fold 11 is gradually formed as a result of the next mechanism. Each point in the flow (which does not lie at the propagation front) travels at a speed that differs from that of the point adjacent to it. This is because the rate of flow is lower near the wall than it is in the central part of the flow. This phenomenon is similar to that of the flow of a river, the rate at which the water flows being lower (or even zero) near the banks of the river and at a maximum in the middle of the river. In this instance, the end 10 therefore travels at a rate that is lower than that of the material above it. This difference in speed has the effect of creating the fold 11 in the layer 2. It must also be noted that the end of the fold 11 is carried along in the flow at a speed higher than that of the end 10 of the layer 2.

Figure 5:
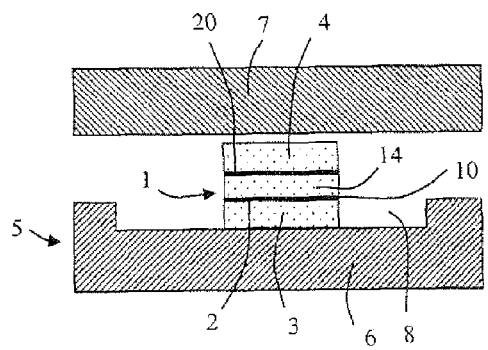
Figure 6:
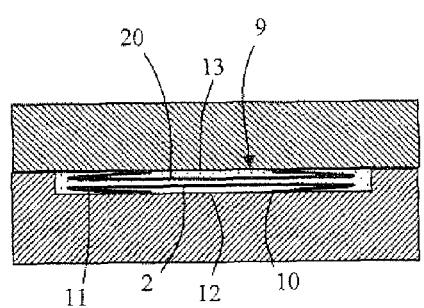

FIGS. 5 and 6 show a second example of the compressing of a dose in which the layers are positioned at right angles to the compression axis.

FIG. 5 illustrates a dose 1 comprising two functional layers 2 and 20 trapped between the layers 3, 4 and 14 of resin. The layers 3 and 4 form the bottom and top surfaces of the said dose respectively and the layer 14 that forms the central layer lies between the layers 2 and 20. The ends 10 of the layers 2 and 20 appear at the lateral surface of the dose 1 or lie close to the said surface. As indicated in FIG. 5, the layer of functional resin 2 lies in the lower part of the dose while the functional layer 20 lies in the upper part. The dose 1 is positioned in the cavity 8 of a mould 5 formed of a shaped cavity 6 and of a punch 7 the relative movement of which compresses the dose and closes the cavity of the said mould 5. The compression direction is at right angles to the layers of which the dose is formed.

FIG. 6 depicts the object 9 that results for a compression of the dose 1 illustrated in FIG. 5 in the mould 5. The object 9 at least locally has a number of layers that exceeds the number of layers in the dose. The functional layers 2 and 20 form folds 11 so that locally the object has 7 or 9 layers whereas the dose is made up of just 5 layers. The ends of the functional layer 2 appear at the bottom surface 12 of the object 9 while the ends 10 of the functional layer 20 appear at the top surface of the said object. The ends of the layers 2 and 20 may appear at the surface of the object 9 or lie near to the said surface. FIGS. 5 and 6 illustrate the influence that the position of the layer within the dose has on the position of the ends 10 within the object. The position of the ends 10 of the layers 2 and 20 near to the surface of the object 9 results from the "fountain flow" of the travelling front of material. The formation of the folds 11 is a consequence of the flow velocity profile within the thickness: near the walls of the mould, the flow rate is zero whereas near the mid-plane, the flow rate is at a maximum. The end of the fold 11 therefore flows at a higher speed than the rate at which the end 10 of the layer 2 flows.

Figure 7:
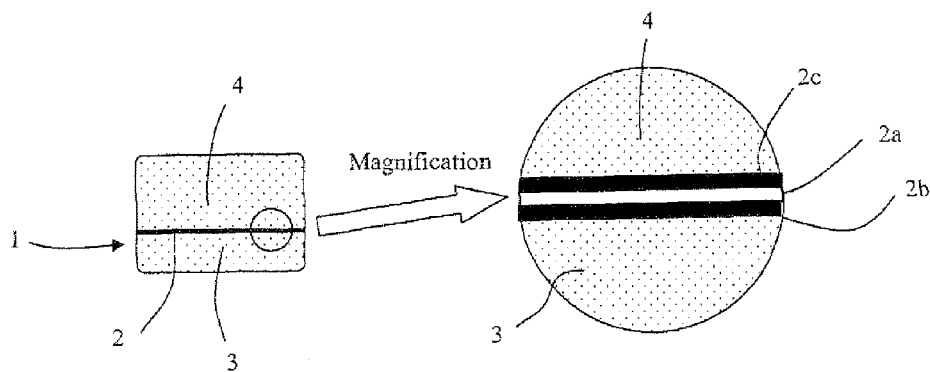
FIG. 7 illustrates the fact that the functional layer 2 may itself be formed of several layers.

FIG. 7 depicts a dose 1 comprising a functional layer 2 trapped between the layers 3 and 4 of resin. In order not to make the description of the invention unduly complicated, the number of layers depicted is deliberately low. However, those skilled in the art know that combining thermoplastic resins of different natures generally entails the use of adhesive layers which bond the layers together at the interface. As depicted in FIG. 7 and by way of example, the functional layer 2 may itself be envisaged in the form of a multilayer structure made up of adhesive layers 2b and 2c and a functional layer 2a.

Contrary to the teachings of the prior art for manufacturing multilayer objects by compression moulding, the invention proposes to compress a dose which is asymmetric about the compression axis. This results in an object in which the distribution of the layers has no axis of symmetry.

FIGS. 8 and 9 describe the compression of a dose which is asymmetric with respect to the compression axis and the multilayer object obtained.

FIG. 8 illustrates views of the dose 1 in section on A and on B. The dose 1 is formed of a functional layer 2 trapped between two layers 3 and 4 of resin. This dose 1 is preferably obtained by extruding a rod the cross section of which corresponds to the view on A of the dose 1. In the view on A, it may be seen that the ends 10 of the functional layer 2 are absent from the side wall 17 of the dose. The direction in which the dose 1 is extruded is indicated by the axis 15. The view on B depicts a second view of the dose 1 in section. In this view, the ends 10 of the functional layer 2 lie at the surface of the lateral wail 17 of the dose. The geometry of the dose 1 is defined by a height 33, a width 31 and a length 32. To produce axisymmetric objects it has been found that a ratio of width 31 to length 32 of close to 1 was advantageous. Likewise, it was found that the ratio of height 33 to width 31 of the dose preferably lay between 0.5 and 2. However, for special objects such as preforms, it is necessary to have a ratio of height 33 to width 31 in excess of 2. The axis along which the dose 1 is compressed is parallel to the axis 16 indicated in FIG. 8.

FIG. 9 shows the object 9 obtained by compressing the dose 1 depicted in FIG. 8 in a mould. The geometry of the object 9 displays an axis of symmetry which is also the axis of compression of the dose. The object 9 is characterized in that its multilayer structure has no axis of symmetry. The view A illustrates a first cross section of the object. The functional layer 2 is trapped between the layers 3 and 4 which, respectively, form the bottom 12 and top 13 surfaces of the object 9. The ends 10 of the functional layer 2 are absent from the lateral wall 17 of the object which means that the said ends have not been carried along by the "fountain flow" situated at the material front. The view on B shows a second view of said object 9 in section. In this view, the functional layer 2 forms a fold 11 at its ends. The ends 10 of the functional layer 2 are visible at the bottom surface 12. The folds 11 form the part of the functional layer 2 furthest from the axis of symmetry of the object 9. Analysis of the flows during compression shows that the fold 11 results from the "fountain flow" at the material front and from the flow velocity profile, the latter being characterized by zero speed at the walls of the mould and a maximum speed at the compression mid plane. The functional layer 2 is absent from the lateral surface 17 of the object. The functional layer 2 forms a complex geometry with no axis of symmetry. It is often desirable for the functional layer 2 to be present as far as the periphery of the object. It has been found that in spite of the functional layer 2 being distributed with no axis of symmetry, the said layer spreads radially as far as a distance close to the lateral wall 17 and over the entire periphery of the object. The distance between the radial end of the layer 2 and the lateral wall 17 of the object varies only slightly. It is found that the greater the length of flow, the smaller the variation in distance between the radial end of the layer 2 and the lateral wall 17.

Figure 10:
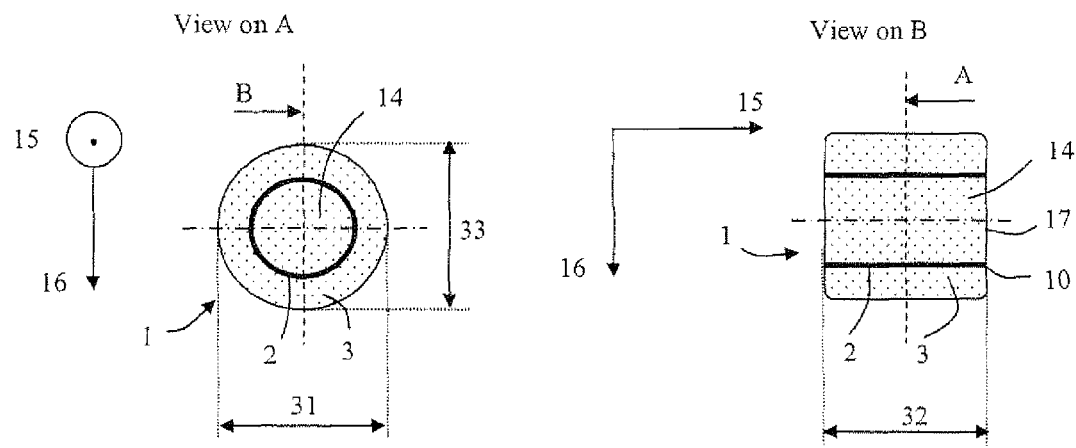
FIG. 10 shows a cylindrical multilayer dose 1 extruded along the axis 15. The dose 1 comprises a functional layer 2 trapped within the dose except at its ends 10.
Figure 11:
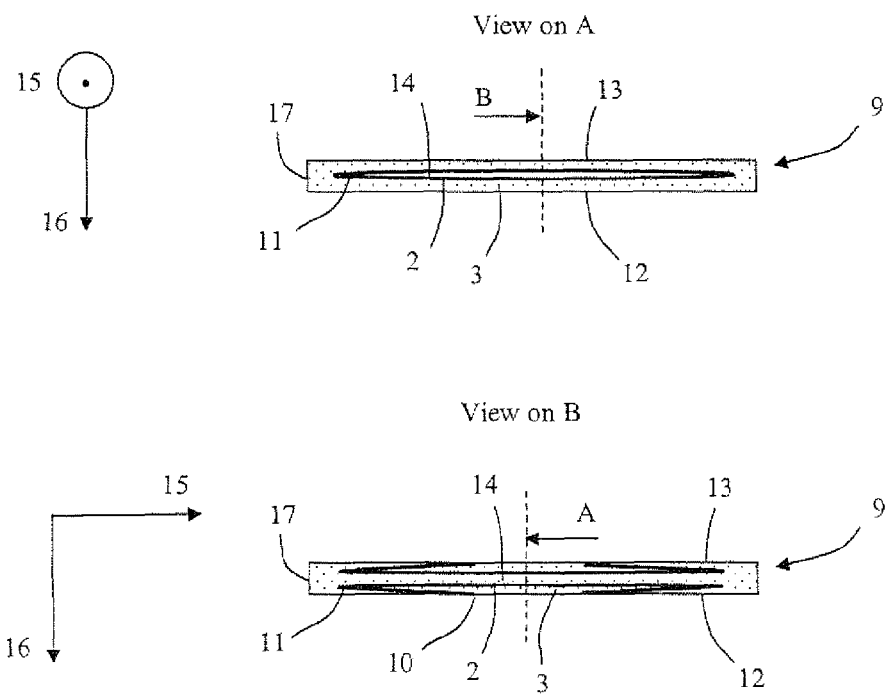
FIG. 11 illustrates the multilayer object obtained after compressing the dose 1 illustrated in FIG. 10 along the axis 16. This object 9 has an asymmetric multilayer structure although the functional layer 2 is propagated uniformly through the object.

FIGS. 10 and 11 describe a second example of the compression of a dose which is not symmetric with respect to the compression axis and the multilayer object obtained.

FIG. 10 depicts views of a dose 1 of cylindrical geometry in section on A and on B. The dose 1 is extruded along the axis 15 and compressed along the axis 16. Within the dose 1, the layers are positioned at right angles to the compression axis. The dose 1 has an axis of symmetry which is the extrusion axis 15 but unlike the teachings of patent U.S. Pat. No. 4,904,512, the dose 1 is compressed at right angles to the axis of symmetry of the said dose 1. The dose 1 is formed by a functional layer 2 trapped between the layers 3 and 14 that respectively form the external and central layers. The view on A illustrates the cross section of the dose 1 at right angles to the extrusion axis 15. The cross section of the dose 1 seen in the view on A of FIG. 10 also corresponds to the cross section of the cylindrical rod which is extruded. The functional layer 2 forms a cylindrical envelope centred on the extrusion axis. The view on B in FIG. 10 illustrates the dose in the direction of its length 32, that is to say in the extrusion direction 15. The ends 10 of the layer 2 appear at the lateral surface 17 of the dose 1. The surface 17 is formed when the extruded rod is cut.

Because the dose 1 forms a cylinder of revolution, its height 33 is equal to its width 31. During the manufacture of axisymmetric objects such as those shown in FIG. 11, it is found that the rate of propagation of the functional layer 2 is not equal in all directions. In order to obtain a uniform distribution of the functional layer through the object it is necessary to optimize both the geometry of the dose and the radial position of the functional layer 2. Thus, various dose geometries of identical volume can be used to form the multilayer object although a dose in which the ratio of the length to the diameter is equal to 1 will not necessarily lead to an optimum distribution of the functional layer 2 through the object. Astonishingly, a dose in which the shape ratio is other than 1 often leads to a more uniform distribution of the functional layer 2 through the object. For example, a ratio of dose length to dose diameter equal to 1.5 gives optimum distribution of the functional layer 2 through the object illustrated in FIG. 11. The cylindrical dose has numerous advantages in the manufacture of objects at high production rates. As we shall explain later on in the description of the invention, the dose is transferred at high speed to the cavity of a mould. Given the speed at which this transfer takes place, it is not always easy to have precise control over the position of the dose within the cavity of the mould. The cylindrical dose illustrated in FIG. 10 has an axis of symmetry which allows for the dose to be rotated about this axis without this altering the moulded object.

FIG. 11 shows an object 9 that exhibits an axis of symmetry and is obtained by compressing the dose 1 illustrated in FIG. 10 in the cavity of a mould. The view on A illustrates a first section through the object. The axes 15 and 16 allow the object to be orientated with respect to the initial positioning of the dose in the cavity of the mould. The axis 16 indicates the compression direction and the axis 15 the axis along which the dose is extruded. The view on A shows how the functional layer 2 has deformed during compression. The layer 2 forms a fold 11 situated near the lateral surface 17 that forms the end of the object. The view on B depicts the object 9 in a plane of section parallel to the extrusion axis 15 and to the compression axis 16. In the view on B it is seen that the ends 10 of the layer 2 are visible at the bottom surface and top surface 12 and 13, respectively, of the said object 9. The layer 2 forms several folds 11 which lie close to the lateral surface 17 that form the end of the object 9. Starting out from the five-layer dose 1, an object 9 locally comprising 9 layers is obtained. The views on A and B illustrate a complex distribution of the functional layer 2 resulting from the invention and which does not feature in the teachings of the prior art.

The method of obtaining the objects described in FIGS. 4, 6, 9 and 11 is an economical method for producing multilayer objects at high production rates. This method involves three main steps which consist in extruding the multilayer dose, transferring and positioning the said dose in the cavity of a mould so that the layers are perpendicular to the compression direction, and finally moulding the multilayer object by compressing the dose in the cavity of the mould.

The method allows a good distribution of the functional layer 2 through the actual object if the multilayer structure has no axis of symmetry.

The method makes it possible to produce objects that have no axis of symmetry by adapting the geometry of the dose to suit that of the object.

Figure 12:
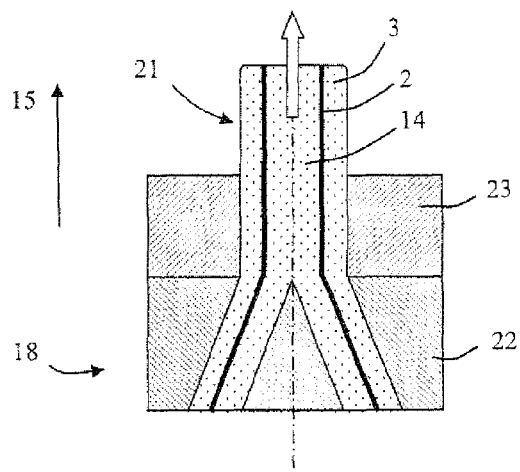
FIGS. 12 to 15 illustrate the method of manufacturing a multilayer object.
Figure 13:
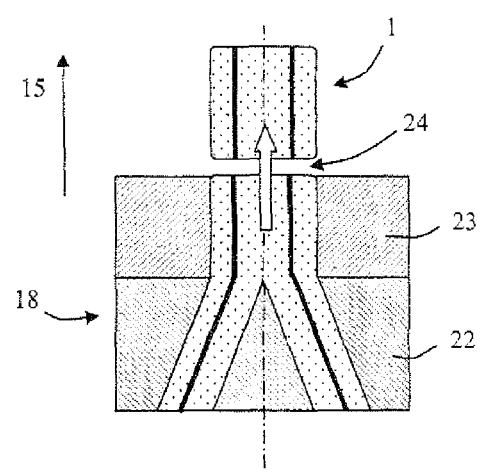

The first step in the method illustrated in FIGS. 12 and 13 is to extrude a multilayer rod 21 and to cut it uniformly to form doses. Uninterrupted extrusion of a multilayer rod makes it possible to achieve very high production rates. However, it may be advantageous to have discontinuous extrusion of the rod or of just some of its layers. Discontinuous extrusion of the rod can be used to make cutting the rod easier. Discontinuous extrusion of some of the layers may make it possible to produce more complex doses in which some of the layers are completely imprisoned even including their ends.

It is also possible to extrude a dose with a hole in it.

FIG. 12 shows the extrusion of a cylindrical rod 21 leaving a co-extrusion head made up of a die 23 and of a co-extrusion unit 22. The co-extrusion unit 22 permits the formation of the multilayer structure, and the die 23 defines the geometry of the rod. The elements 22 and 23 have been depicted very schematically such that these elements are not depicted exactly. The co-extrusion heads for making tubes, profiles or multilayer sheets are widely described in the prior art. The co-extrusion head is connected to several extruders which feed it with the resins that form the layers, in the molten state. The rod 21 is formed of the stack of layers 3, 2 and 14 of resins in the molten state. The extrusion temperature depends on the nature of the resins being extruded. In general, this temperature ranges between 100° C. and 300° C.

FIG. 13 illustrates the cutting 24 of the rod 21 to form the dose 1. Many devices for cutting doses have been described in the prior art. Let us mentioned by way of example rotary devices in which the cutter may be independent of or included in the device used to transfer the dose. Some cutters involve a relative movement of two blades which cut the dose in the manner of a pair of scissors. Other devices involve a shutter which in its closing movement cuts the rod or tube 21.

Figure 14:
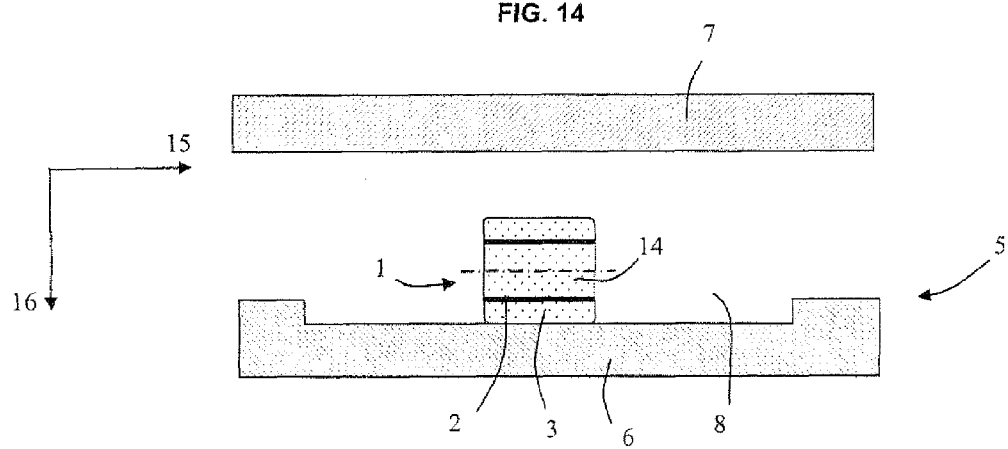

FIG. 14 depicts the positioning of the dose 1 in the cavity 8 of a moulding device comprising a mould 5 formed of at least one shaped cavity 6 and a punch 7 the relative movement of which compresses the dose and forms the object. The dose 1 is positioned in the cavity 8 in such a way that the compression direction 16 is perpendicular to the layers. The way in which the dose is transferred into the mould is not depicted. A transfer device may be used to orientate the dose and position it in the cavity. Other methods involve depositing the extruded dose directly in the cavity of the mould. The transfer of the dose into the cavity of the mould is an operation that has to be done quickly in order to prevent the dose from cooling and exhibiting non-uniform temperatures while it is being compressed.

Figure 15:
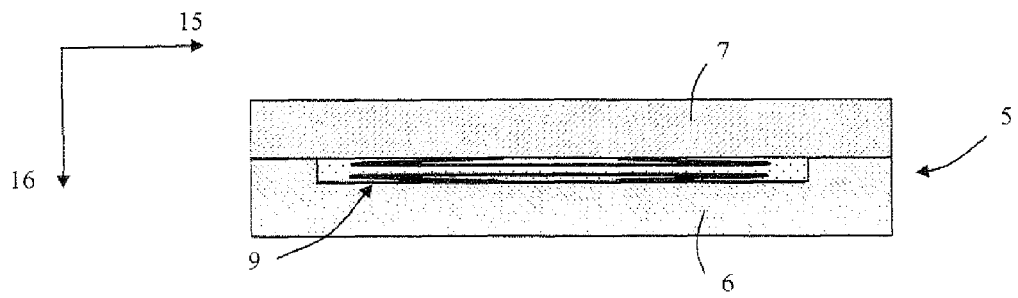

FIG. 15 depicts the view in cross section of the object 9 obtained by compressing the dose 1 in the mould 5. The mould 5 generally comprises a cooling circuit to solidify the molten method and chill the object sufficiently to allow it to be released from the mould. The mould temperature is generally regulated to a temperature ranging between 0° C. and 60° C.

An important factor in the method is to optimize the geometry of the dose to suit the geometry of the object. To produce an object that has an axis of symmetry such as a stopper, a cup or a cap, the ratio of the length 32 to the width 31 of the dose is not necessarily equal to 1. For a dose like the one illustrated in FIG. 10, the said ratio is generally other than 1, but for a dose like the one illustrated in FIG. 8, the said ratio is advantageously close to 1. The length 32 of the dose is defined by the extruder output rate and the chopping frequency; the width 31 and the height 33 of the dose are defined by the geometry of the die 23. The position of the layers in the dose is optimized to obtain the desired distribution of the functional layer 2. The ratio of the height 33 to the width 31 is dependent above all on the geometry of the object and generally ranges between 0.2 and 5 and preferably between 0.5 and 2. In order to make it easier to handle the dose at very high production rates, a height-to-width ratio of close to 1 is often used.

The method described in the invention makes it possible to produce objects with or without holes, but the said method is particularly advantageous for producing at high production rates multilayer packaging components which have no holes. These packaging components may be plastic stoppers, cups, or alternatively caps. The multilayer structures are advantageous because they make it possible to improve the barrier properties of the said objects. Often it is necessary to improve the impermeability of these objects to oxygen, to carbon dioxide or to aromas. The invention allows this improvement to be made without penalty to the production rate and without generating waste. However, it is necessary in certain applications to avoid contact between the functional layer 2 and the packaged product. It is then appropriate to prevent the ends 10 of the layer 2 from being present at the surface of the object in contact with the said product.

Methods for controlling the position of the ends 10 of the functional layer 2 in the object are set out hereinbelow.

A first method is to provide a position of the layers within the dose such that the ends of the functional layer 2 are absent from the surface of the object in contact with the product. FIG. 9 shows an example in which the ends 10 of the functional layer 2 are not present at the top surface 13 of the object in contact with the packaged product. Trapping the ends 10 of the functional layer 2 within the dose leads to an object that has a layer 2 completely absent from its surface. Trapping the ends 10 within the dose can be done by intermittent extrusion of the layer 2 or when cutting and transferring the dose.

FIGS. 16 and 17 illustrate the production of packaging 9 in which the functional layer 2 lies close to the top surface 13 in contract with the packaged product, and in which the ends 10 of the functional layer 2 are absent from the said top surface 13. FIG. 16 depicts the dose 1 formed of a functional layer 2 trapped between the layers 3 and 4 of resin. The ends 10 of the layer 2 appear at the lateral surface 17 of the said dose. The dose 1 is positioned in the cavity 8 of the mould 5. FIG. 17 depicts the object obtained by compressing the dose 1 illustrated in FIG. 16. The object 9 comprises a top surface 13 forming the internal surface of packaging, the said surface 13 being in contact with the packaged product. The functional layer 2 lies close to the top surface 13 of the object 9 but is absent from the said surface 13. The ends 10 of the functional layer 2 are present at the surface 12 that forms the external surface of the packaging. The absence of the ends 10 from the internal surface of the packaging depends on the position of the layer 2 in the dose and on the geometry of the object.

Another method for avoiding contact between the packaged product and the ends of the functional layer 2 is to modify the type of contact between the molten resin and the wall of the mould. It is particularly advantageous to have contact of the sliding type over part of the tooling and contact of the sticking type over the opposite part of the tooling. It is, for example, possible to use contact of the sliding type between the punch 7 and the molten resin and sticking contact between the shaped cavity 6 and the molten resin. By modifying the contact between the wall of the mould and the molten resin the position of the ends of the functional layer can be altered. The type of contact is dependent on the materials of which the surface of the mould is made and on the surface finish of the said mould.

When producing objects at high production rates it is not always easy to ensure the correct positioning of the dose. Indeed it may happen that the dose rotates on itself while it is being transferred or positioned in the cavity of the mould, which would cause the functional layer 2 to be inappropriately positioned at the time of compression. Rotation of the dose may for example cause the functional layer 2 to become positioned parallel to the compression axis when a perpendicular positioning was desired. In order to obviate this difficulty, it is possible to alter the geometry of the dose by reducing its height relative to its length and width. However, when producing multilayer objects at high production rates it is not always possible to handle a dose that is short in height.

Figure 18:
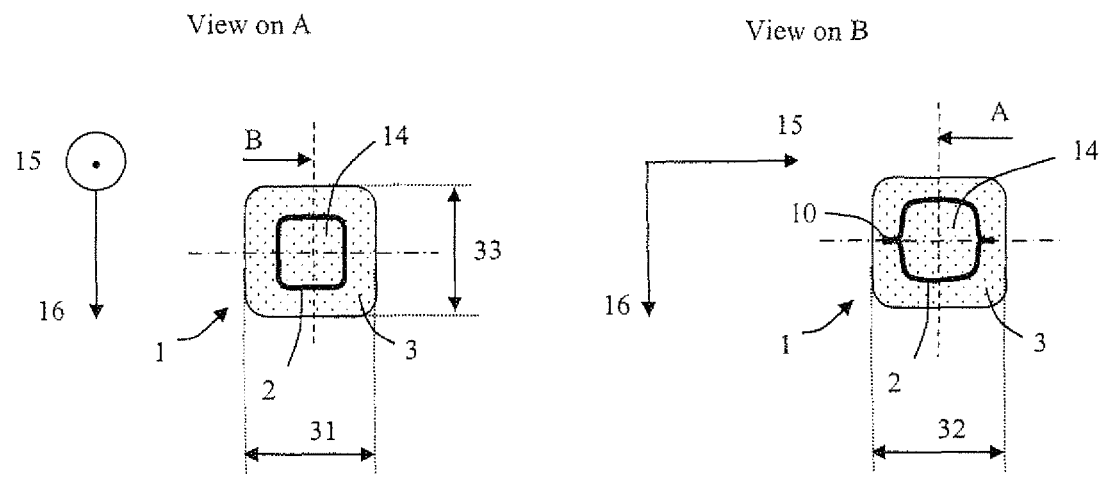
FIGS. 18 and 19 illustrate an example in which the ends 10 of the layer 2 are trapped within the dose 1 and within the object 9.

FIG. 18 proposes a dose which is particularly advantageous in that its rotation has no impact on the multilayer object obtained. The view on A shows a cross section at right angles to the extrusion axis 15. The dose 1 is cylindrical of square cross section and comprises a layer 2 trapped between the layer of resin 3 that forms the surface of the dose and the layer 14 that forms the central part. The view on B depicts the dose in a plane formed by the extrusion axis 15 and the compression axis 16. The functional layer 2 traps the layer 14 and its ends are absent from the surface of the dose. The width 31, the length 32 and the height 33 are equal, the dose 1 thus forming a geometry close to that of a cube or a sphere. Manufacture of the dose 1 entails discontinuous extrusion of the layers 14 and 2.

Figure 19:
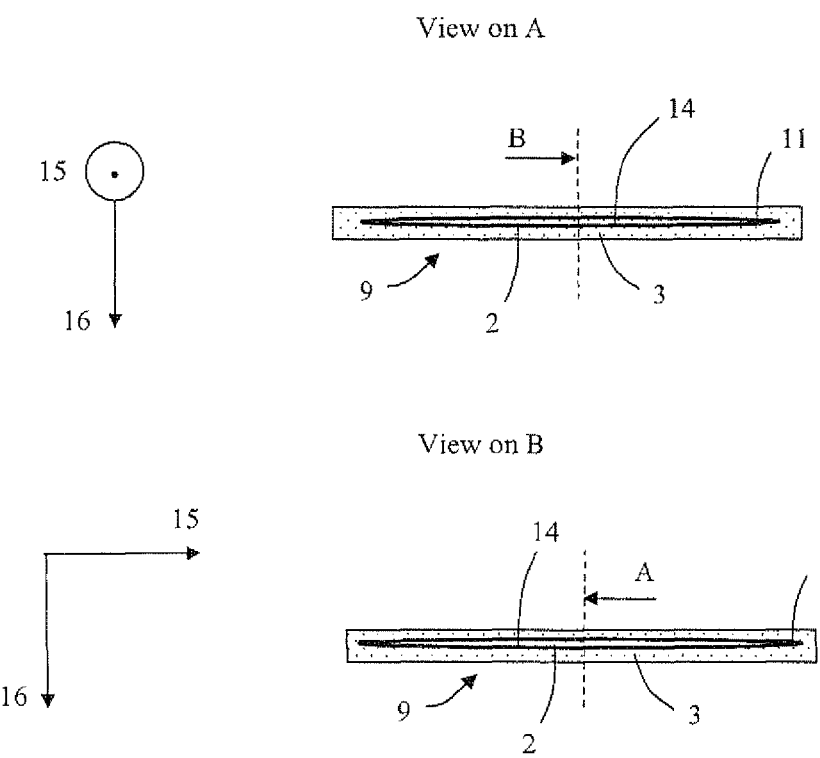

FIG. 19 depicts the object obtained by compressing the dose 1 in a mould. The layer 2 is completely absent from the surface of the object. The object obtained is independent of the angular position of the dose in the mould cavity.

The centring of the dose in the cavity of the mould is one of the key points in producing multilayer objects by compression moulding because if the dose is not correctly centred in the cavity of the mould then flow is radially uneven and the functional layer is poorly distributed through the object. However, for certain objects it so happens that the barrier is not required throughout the object. For a stopper for example, it is often the case that the barrier is not required in the lateral wall, the presence of the barrier layer being at least required in the stopper. It has been discovered that a suitable dose is able to guarantee that the functional layer will be present in the end wall of the stopper even if the dose is off-centred in the cavity of the mould.

The ratio of viscosities between the layers has a large part to play in the flows at the time of compression and therefore in the resulting multilayer structure of the object. Differences in viscosity between the layers make it possible to alter the position of the ends 10 of the functional layer 2 within the object. Differences in viscosity between the layers are used in particular to trap the ends 10 of the layer 2 within the object so that the layer 2 is entirely absent from the surface of the said object. For example, it may be advantageous to have a more viscous functional layer 2. A second example consists in having a layer of more fluid resin situated close to the functional layer and which, because of its low viscosity, traps the ends of the functional layer 2 as it flows. It has been found that a ratio of viscosities between the layers greater than 5 makes it easier to trap the end 10 of the layer 2 within the object. Within the spirit of the invention, it is possible to modify the viscosity of more than one layer in order to trap the ends of the layer 2 in the object.

It is not always possible to alter the relative viscosity of the layers in order to entirely trap the layer 2. Excessive differences in viscosities between the layers may lead to difficulties in extruding, cutting or alternatively in transporting and positioning the dose in the cavity of the mould. An alternative method is therefore proposed which consists in trapping the ends 10 of the layer 2 in the dose. The ends 10 of the layer 2 can be completely trapped within the dose in two ways: a first method involves intermittent extrusion of the layer 2 while the other layers are extruded without interruption. A second method consists in trapping the ends 10 of the layer 2 at the time of cutting or transporting the dose.

FIGS. 20 to 23 show the effect of positioning a dose 1 off-centre in the cavity 8 of a mould 5 for producing stoppers.

Figure 20:
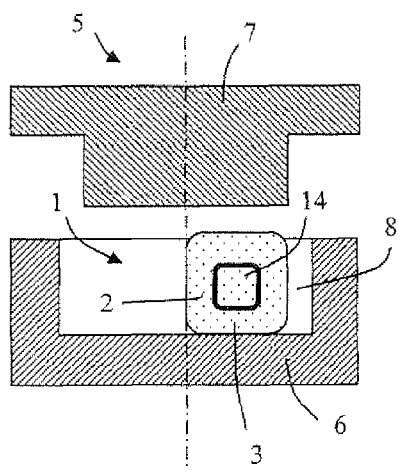
FIGS. 20 to 23 show the influence of positioning the dose 1 off-centred in the cavity 8 of the mould 5.

FIG. 20 shows a first example of a dose 1 off-centred in the cavity 8 of a mould 5 made up of a shaped cavity 6 and of a punch 7. The position of the layer 2 in the dose is optimized so that following the compression moulding operation the said layer 2 lies at least in the part that forms the end wall of the stopper. A position for the layer 2 within the dose 1 has been found that allows the dose 1 to be positioned randomly in the cavity 8 of the said mould 5. The geometry of the dose is optimized according to the geometry of the object.

Figure 21:
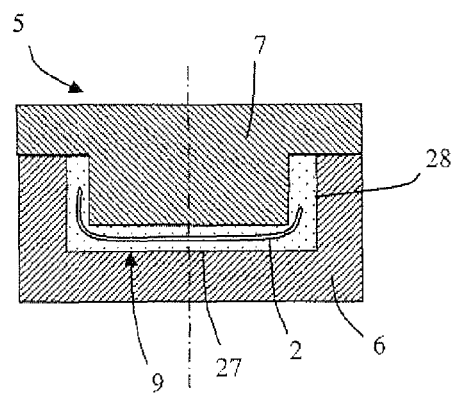

FIG. 21 depicts the stopper 9 obtained by compressing the dose 1 which is positioned off-centre in the cavity 8 of the mould 5. The functional layer 2 is only partially present in the lateral wall 28 of the said stopper 9 but the functional layer 2 is distributed throughout the end wall 27 of the said stopper.

Figure 22:
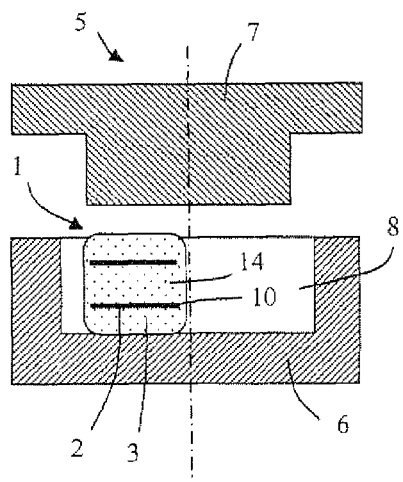

FIG. 22 illustrates a second example of a dose 1 which is not centred in the cavity 8 of a mould 5.

Figure 23:
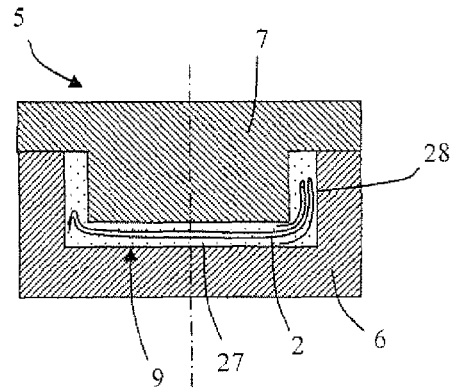

FIG. 23 depicts the stopper 9 obtained by moulding the dose 1 shown in FIG. 22. The functional layer 2 lies at least in the part 27 that forms the end wall of the stopper 9. The lateral wall 28 is only partially multilayered.

The foregoing examples are of great benefit in the production of stoppers at high production rates. There is no need to position the dose accurately in the cavity of the mould, it being possible for the dose to be positioned randomly in the said cavity. This aspect of the invention is particularly advantageous because it entails very little modification to existing equipment and allows the production of multilayer stoppers without reducing production rates with respect to the production of single-layer stoppers.

A final major benefit of the invention is the possibility of producing multilayer objects that have no axis of symmetry such as oval stoppers for example.

Figure 24:
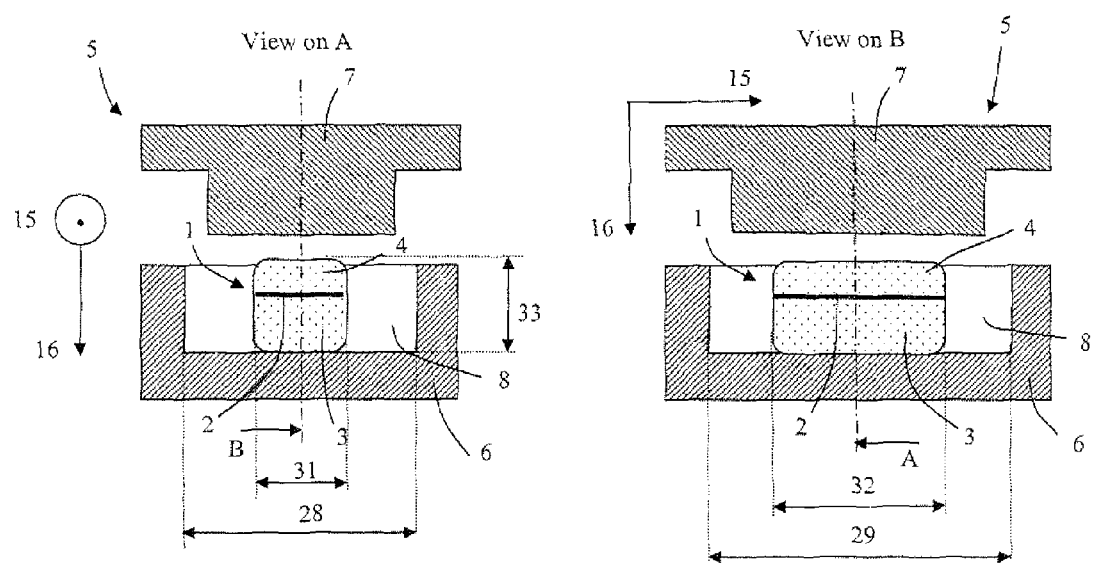
FIGS. 24 and 25 show the production of objects that have no axis of symmetry.
Figure 25:
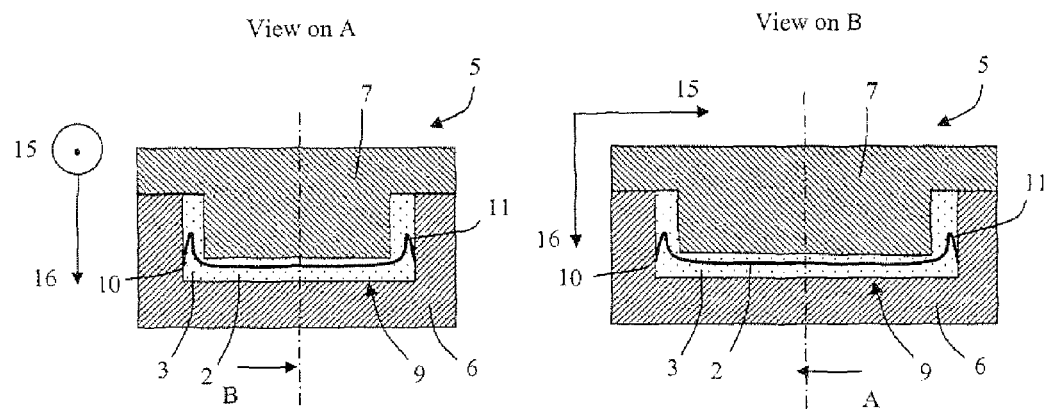

This aspect of the invention is illustrated by FIGS. 24 and 25 which depict the manufacture of a stopper of oval geometry using a dose of which the ratio of length to width is greater than 1.

FIG. 24 illustrates the positioning of a dose 1 in the cavity 8 of a mould 5. The view on A depicts the cross section of the dose at right angles to the extrusion direction 15. The view on B depicts a second cross section of the dose on a plane containing the axis of the dose 15 and the compression axis 16. From the views on A and on B it can be seen that the length 32 of the dose is greater than the width 31 of the said dose and likewise that the length 29 of the cavity is greater than the width 28 of the said cavity. The geometry of the dose is optimized so that the distribution of the functional layer through the said object will be correct. In some instances this is obtained with a dose length 32 to width 32 ratio substantially equal to the ratio of the length 29 to the width 28 of the cavity.

Figure 28:
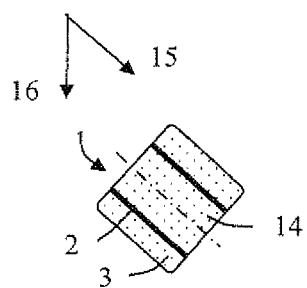
FIGS. 28 to 30 illustrate a method which consists in deforming the dose before positioning it in the mould.

FIG. 25 depicts the stopper 9 obtained by compressing the dose 1 shown in FIG. 28. The views in section on A and B show the distribution of the layers in two perpendicular planes that symmetrically intersect the stopper 9. It may be seen that the functional layer 2 is correctly distributed throughout the object.

FIGS. 26 to 30 show an alternative form of the invention whereby the dose compression axis 16 is oblique with respect to the extrusion axis 15.

Figure 26:
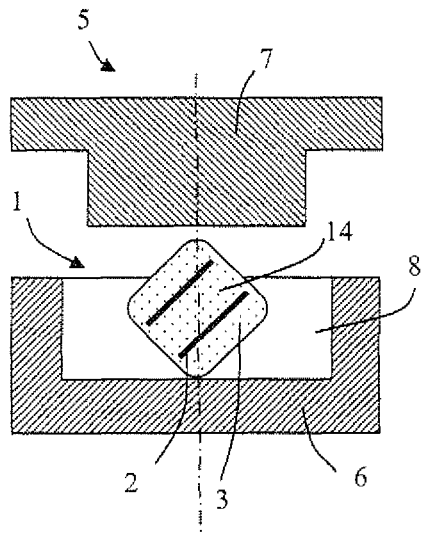
FIGS. 26 and 27 illustrate the compressing of the dose in a direction which is oblique with respect to the extrusion axis 15.

FIG. 26 depicts a view in section of a coextruded dose 1 comprising a functional layer 2 trapped between two layers 3 and 14 of resin. The dose 1 is positioned in the cavity 8 of a moulding device comprising a mould 5 formed of at least one shaped cavity 6 and a punch 7 the relative movement of which compresses the dose and forms the object. The dose 1 is positioned in the mould in such a way that the compression axis makes an angle with the dose extrusion axis. The compression axis is not perpendicular to the extrusion axis.

Figure 27:
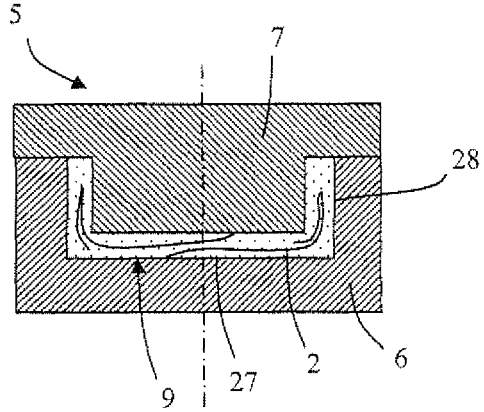

FIG. 27 depicts the view in section of the object 9 obtained by compressing the dose 1 in the mould 5. It is interesting to note the superposition of the layer 2 at the centre of the object.

Compressing a dose along an axis that is oblique with respect to the extrusion axis is sometimes difficult to achieve because of the instability of the dose in the oblique position as illustrated in FIG. 26. In order to get around this difficulty, one method is to deform the dose before positioning it in the cavity of the mould. A schematic depiction of this method is illustrated in FIGS. 28 to 30.

FIG. 28 illustrates the section view of a multilayer dose 1 extruded along the axis 15. The dose 1 comprises a functional layer 2 trapped between two layers 3 and 14 of resin.

Figure 29:
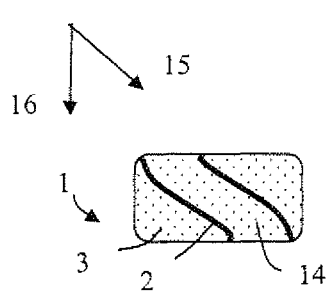

FIG. 29 illustrates the deformation of the dose 1 before it is positioned in the mould. This deformation may be performed by compression, by shearing or by elongating the dose between appropriate tools. FIG. 29 illustrates deformation of the dose 1 by compression along the axis 16. The deformation is advantageously performed while the dose is being cut or while the dose is being transferred into the cavity of the mould. The deformation of the dose as illustrated in FIG. 29 makes it easier to position the dose in the cavity of the mould.

Figure 30:
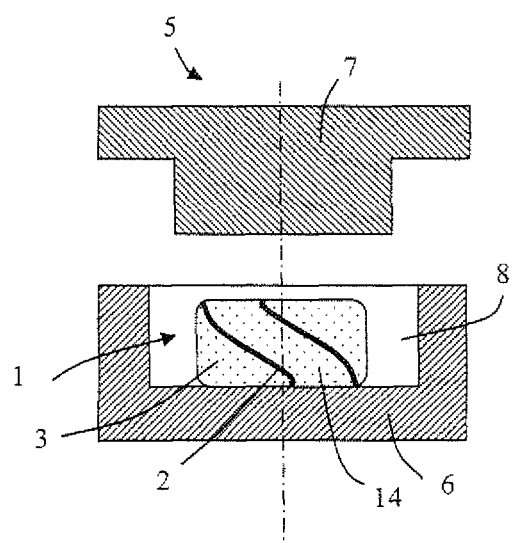

FIG. 30 shows the dose 1 in the cavity 8 of the mould 5 prior to the compression step. The dose is highly stable, making the compression method more robust and repeatable.

The resins used in the context of the invention correspond to the thermoplastics commonly used and more particularly those used in the field of packaging. Among functional resins that can be used mention may be made of ethylene/vinyl alcohol (EVOH) coplymers, polyamides such as nylon-MDX6, acrylonitrile/methyl acrylate (BAREX™) copolymers, fluoropolymers such as PVDF. Let us also mention a number of resins that can be used for the layers that form the structure of the object: polyethylene (PE), polypropylene (PP), polystyrene (PS), polyamide (PA), polyester (PET). This list is not exhaustive.

The compression moulding method consists in supplying a multilayer dose of synthetic resins in the molten state to the cavity of a mould, in forming the object by compression moulding the said dose in the cavity of the mould and in cooling the object then releasing it from the mould.

The device according to the invention comprises at least means for co-extruding the multilayer doses, means for transferring the multilayer dose into a compression mould and means for comprising the dose in order to form the object.

The invention makes it possible to produce objects with a very thin functional layer that may represent less than 5% of the volume of the object.

The method of producing the multilayer object which has been set out hereinabove is particularly advantageous in the production of objects such as stoppers, lids, caps and pots. This method can also be used advantageously to produce preforms in the shape of coins, these coins then being used for thermoforming or thermoforming combined with blowing in order to form multilayer objects.

The invention claimed is:

1. A method of manufacturing a multilayer object made from synthetic resin by compression moulding a dose of molten multilayer resin comprising a single continuous functional layer, and each layer of the dose is in a molten state at the time of compression, wherein the method comprises:
co-extruding the resins through a die to yield an extrudate,
cutting the extrudate periodically in order to obtain a dose in a molten state,
depositing the dose in the molten state in a cavity of a mould for compression moulding,
wherein the method has an extrusion direction and the functional layer is parallel to the extrusion direction before compression moulding,
compressing the dose along a compression axis that intersects the extrusion direction, so as to introduce asymmetry into the flow of the multilayers with respect to the compression axis, thereby resulting in an object having an asymmetric distribution of the multilayers with a single continuous functional layer, and
wherein the method results in a packaging component selected from the group consisting of a stopper, cup, or cap.

2. The method according to claim 1, wherein the dose is compressed in a direction that intersects a main axis of the dose at right angles, wherein the main axis is in the extrusion direction.

3. The method according to claim 2, wherein the dose is in a form of a rectangular parallelepiped.

4. The method according to claim 2, wherein the dose has a circular cross section.

5. The method according to claim 4, wherein the dose is in the form of a cylinder with layers arranged coaxially in the extrusion direction.

6. The method according to claim 5, wherein the dose has a functional layer that forms an envelope around a main axis of the dose, wherein the main axis is in the extrusion direction.

7. The method according to claim 1, wherein the dose is compressed in a direction that intersects the extrusion direction at an acute or obtuse angle.

8. The method according to claim 1, wherein the dose is deposited in the mould off-centre.

* * * * *